(No Model.) 2 Sheets—Sheet 2.
J. FLANNERY.
GAS AND LIQUID HOLDER.
No. 420,193. Patented Jan. 28, 1890.
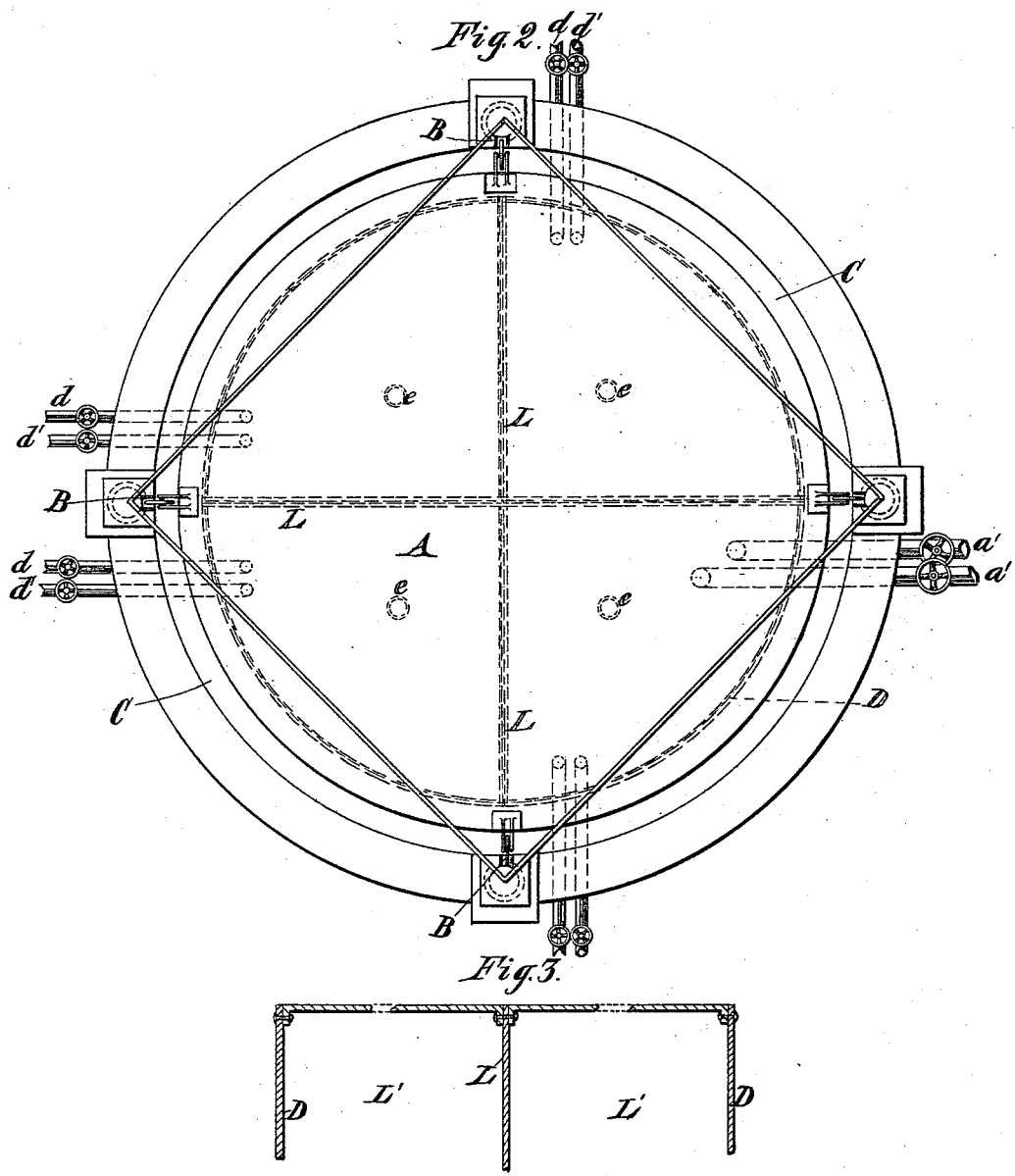

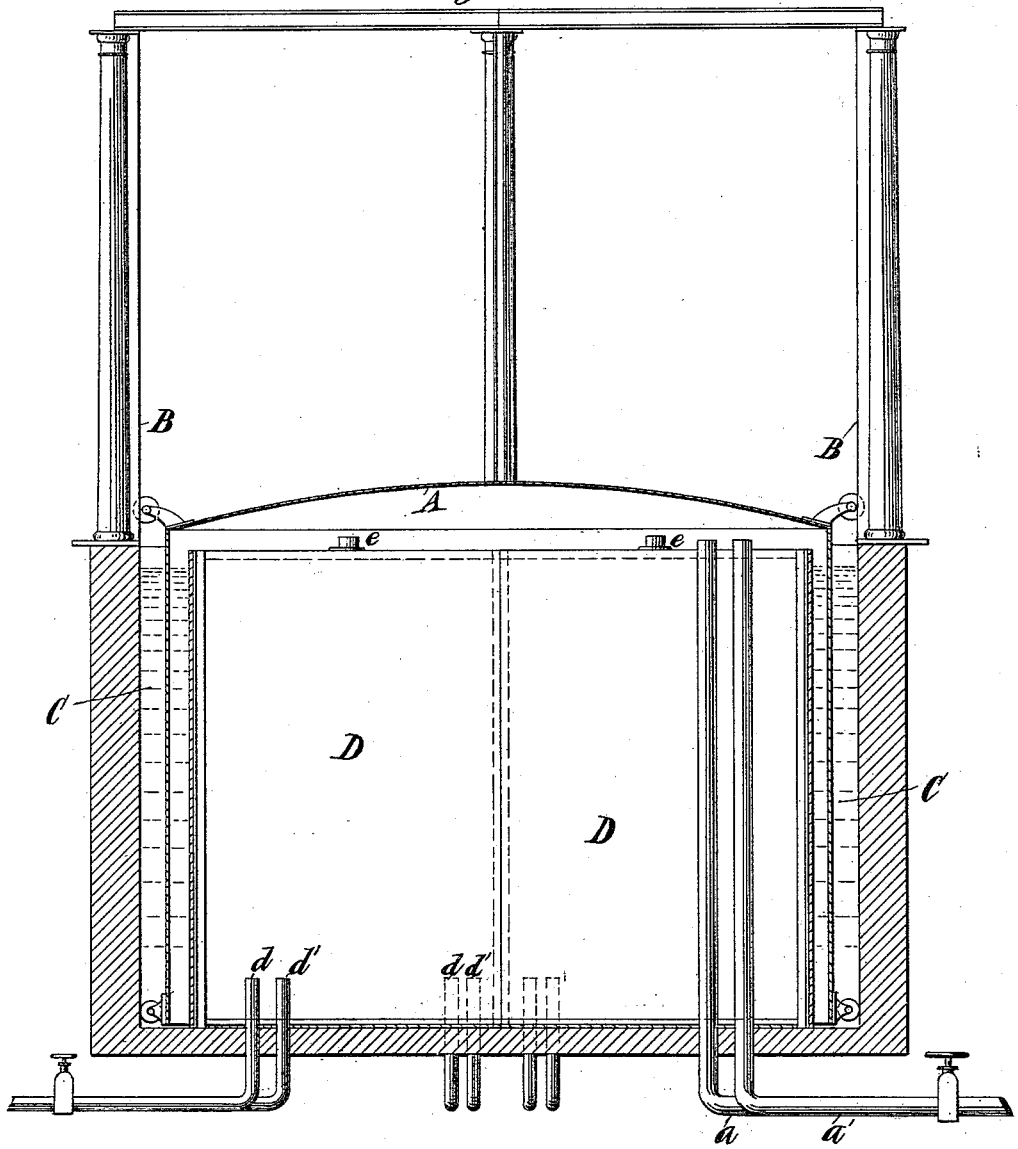

UNITED STATES PATENT OFFICE.

JOSEPH FLANNERY, OF NEW YORK, N. Y.

GAS AND LIQUID HOLDER.

SPECIFICATION forming part of Letters Patent No. 420,193, dated January 28, 1890.

Application filed May 9, 1889. Serial No. 310,086. (No model.)

*To all whom it may concern:*

Be it known that I, JOSEPH FLANNERY, residing at New York, in the county and State of New York, have invented a certain new and useful Improvement in Gas and Liquid Holders, of which the following is a specification.

The object of my improvement is to provide a simple and ready means for storing liquid, and particularly oil to be used in the manufacture of gas; to effect a saving of the gaseous vapors arising from the evaporation of the stored oil and prevent the escape of such vapors into the surrounding atmosphere; to provide means for forcing the liquid stored in the tank therefrom; to guard against danger from explosion of the oil, and to effect a saving of ground-space over what has heretofore been possible as such storage-tanks have been erected. To accomplish these results I place a tank for containing the liquid directly within the gas-holder, whereby the tank will be always surrounded by water, by which the gas-holder is sealed, and will therefore be always kept cool and at the same time so inclosed as to be protected against danger from sparks or other causes, which might tend to induce an explosion. I further provide the tank with vents by which the gaseous vapors arising from the evaporation of oil within the tank may pass directly into the gas-holder, thereby not only enriching the gas in the holder and preventing waste, but also providing against the escape of such gaseous vapors into the surrounding atmosphere, as is the common practice, by which the atmosphere is contaminated and the health of a neighborhood endangered. As the tank is in open communication with the gas-holder in which a heavy pressure is maintained, the weight of the holder and the pressure therein will operate to force oil out of the tank through its delivery-pipe, and raise it to a considerable elevation when it is desired to withdraw the oil, the effect being that of a force-pump. The arrangement of the tank within the holder will not curtail the gas-space of the gas-holder, for the reason that the space occupied by the tank is ordinarily filled with water. By placing the tank within the gas-holder it will be seen, also, that a considerable saving is effected in the ground-space over what could be effected if the tank and the gas-holder occupied different and separate positions.

In the present example of my improvement I divide the liquid or oil tank into compartments by means of partitions. As here shown there are two such partitions dividing the tank into four compartments. I wish it to be understood, however, that I may use any desired number of compartments. In the various compartments oil or liquid of different kinds may be stored.

In the accompanying drawings, Figure 1 is an elevation, partly in section, of a gas-holder and tank embodying my improvement. Fig. 2 is a plan or top view of the same. Figs. 3 and 4 are details, partly in section, and showing a method for constructing the tank and arranging the partitions therein.

Similar letters of reference designate corresponding parts in all the figures.

A designates the gas-holder, which may be of the usual or any desired construction, adapted to be moved upwardly and downwardly in the frame B.

C designates the well in which the lower portion of the gas-holder is received and in which the water is contained.

$a\ a'$ designate gas inlet and outlet pipes, respectively, which may be of the ordinary construction and open directly into the gas-holder. They are provided with cocks of ordinary construction.

D designates a liquid-tank, which tank has, as shown, a closed bottom and top, and is secured at its lower side to the bottom of the well C.

$d\ d'$ are respectively filling and emptying pipes, by which liquid is delivered to and from the tank D. They are provided with cocks, also of ordinary construction.

$e$ designates vents in the upper portion of the tank, a single vent being, as shown, provided for each of the compartments, by which means open communication is afforded between each compartment of the tank and the gas-holder.

L designates partitions extending through the tank and vertically therein. These partitions form compartments L′ in the tank.

These compartments are adapted to contain any liquid which it is desirable to hold, but more particularly a liquid considered dangerous on account of its explosive character. In the example shown there are but two partitions L, which form four compartments in the tank. Of course a different set of filling and emptying pipes $d\ d'$ is used for each compartment, and of course it is to be understood that there may be a separate vent $e$ for each of the compartments. Gaseous vapors arising from oil stored in the tank will pass out through the vents $e$, and will become mixed with the gas in the gas-holder, thereby enriching such gas and preventing the waste of said gaseous vapors, besides wholly confining them, so that they cannot escape into the surrounding atmosphere.

When it is desired to withdraw oil from a compartment in the tank, the cock in its filling-pipe is closed and the cock in the emptying-pipe is opened. The weight of the gas-holder and the pressure therein will then operate to force oil out through the emptying-pipe and raise it to a level considerably above the lever of the oil in the tank. This is advantageous where the tank and holder are situated at a level below that at which it is desired to use the oil. Of course, instead of using separate pipes for filling and emptying the compartments, both operations might be performed through a single pipe.

What I claim as my invention, and desire to secure by Letters Patent, is—

The combination, with a gas-holder, of a tank for liquid arranged in said gas-holder and divided into compartments, pipes by which gas is admitted directly into and withdrawn directly from said gas-holder, vents for said compartments by which open communication is afforded between said compartments, and the gas-holder and pipes communicating with the compartments by which liquid may be introduced into and withdrawn from the compartments, substantially as and for the purpose specified.

JOSEPH FLANNERY.

Witnesses:
W. P. ELLIOTT,
JOS. D. HUNTINGTON.